June 26, 1956  W. C. DUNLAP, JR  2,752,553
MAGNETO-RESPONSIVE DEVICE CONTROL SYSTEM
Original Filed Oct. 19, 1949
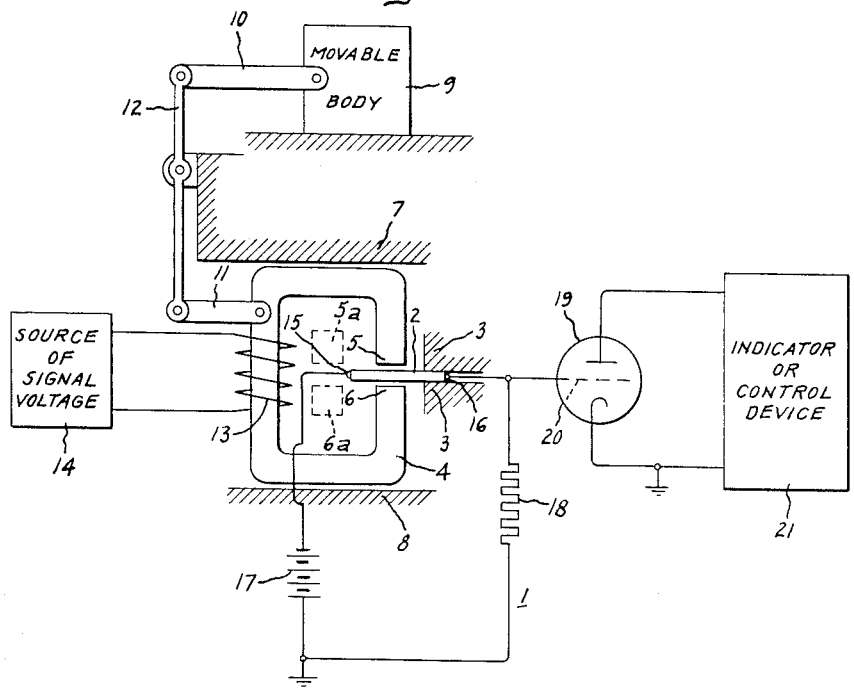
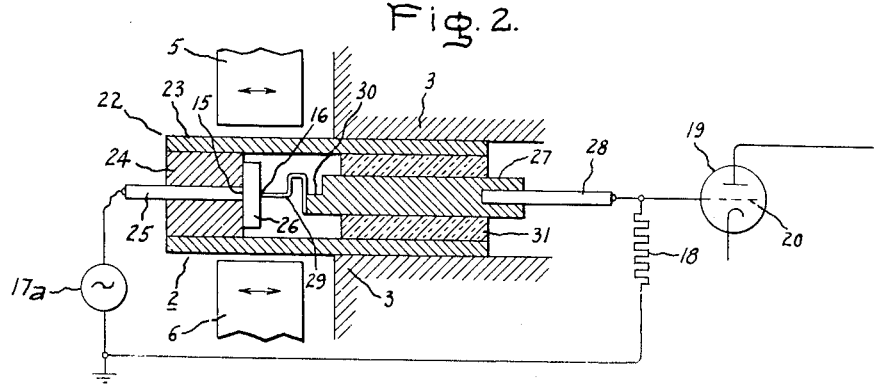
Inventor:
William Crawford Dunlap, Jr.,
by Paul A. Frank
His Attorney.

ial No. 122,243, filed October 19, 1949, and assigned to
United States Patent Office 2,752,553
Patented June 26, 1956

2,752,553

MAGNETO-RESPONSIVE DEVICE CONTROL SYSTEM

William Crawford Dunlap, Jr., Schenectady, N. Y., assignor to General Electric Company, a corporation of New York Original application October 19, 1949, Serial No. 122,243. Divided and this application March 10, 1953, Serial No. 341,573

4 Claims. (Cl. 321—46)

This invention relates to a magneto-responsive device system employing a semi-conductor, the electrical resistance of which is controllable by a magnetic field. This application is a division of my copending application Serial No. 122,243, filed October 19, 1949, and assigned to the same assignee as the present application, now abandoned.

Known magneto-responsive systems which are capable of producing an electrical signal output are generally of the type employing a magneto-inductive transformer having a variably excited primary winding or employing a magneto-inductive generator having a physically relatively movable magnetic armature. In any of these magneto-inductive systems the output voltage signal is dependent upon a rate of change in a magnetic field which is produced in the transformer by a changing current in a primary winding, and in the generator by the relative movement between the magnetic parts. However, it is often desirable to obtain an electrical signal which subsists when no change occurs and when no rate of change exists, but a signal which nevertheless indicates the magnitude of a direct current excitation signal in an apparatus with relatively fixed parts or indicates the relative positions of relatively movable parts, while at the same time giving an indication of magnitude of input signal or change of relative position in terms of the magnitude of excitation or instantaneous position in these devices.

It is, therefore, an object of my invention to provide a magneto-responsive device system which is a direct current amplifier as well as an alternating current amplifier.

Another object of the invention is to provide a magneto-responsive device system which responds both to direct current and alternating current signals and which may employ a direct current or alternating current power source.

It is a further object of my invention to provide a magneto-responsive device system which may be used as a position indicator to indicate the relative positions of two relatively movable parts in terms of the electrical resistance of an output circuit or the magnitude of an electrical output derived therefrom.

The invention, therefore, generally comprises an arrangement including a semi-conductor element the resistance of which is responsive to a magnetic field therethrough and an apparatus for the creation of such a magnetic field in accordance with an input signal, and lead connections for the measurement of the resistance of the semi-conductor. In accord with a further feature of the invention, the semi-conductor element comprises a point contact type semi-conductor rectifier having a high rectification ratio. This point contact rectifier is connected in series with an alternating current source to provide a simultaneous rectification and enhanced magneto-resistive control of current in this series circuit, whereby a unidirectional current component is produced in the impedance which varies in accord with the intensity of a magnetic field through the semi-conductor rectifier.

The features which I desire to protect are pointed out with particularity in the appended claims. The invention itself, together with further objects and advantages thereof may be best understood by reference to the following description taken in connection with the drawing, in which:

Fig. 1 shows the magneto-responsive device system of this invention including electrical circuit components which are shown schematically; and Fig. 2 is an enlarged detail view of an embodiment of the invention wherein the invention is used with an alternating current source and one of the contacts with the semi-conductor element is a pointed sharpened wire to provide a simultaneous rectification and enhanced magneto-resistive control of the current flowing in the circuit of the semi-conductor element.

Referring more particularly to the drawing, in Fig. 1 there is shown a magneto-responsive device system which includes a semi-conductor element or member 2 held in a fixed position by clamping members 3. The semi-conductor itself may be characterized as a magneto-responsive device. A magnetic structure 4, with pole pieces 5 and 6, is positioned to set up a magnetic field through semi-conducting member 2. Magnetic structure 4 is adapted for movement along guides 7 and 8. This movement may occur in response to movements of a movable body 9 transmitted through a suitable linkage such as that comprising links 10 and 11 and lever 12. Magnetic structure 4 may be a permanent magnet or an electromagnet with an excitation winding 13 which may be energized from a source of signal voltage 14. Suitable electrical connections to the semi-conductor element 2 are made at 15 and 16. A resistance measuring circuit provided at these connections comprises a source of electrical energy such as battery 17 and a load impedance such as resistor 18 which are connected in series with the semi-conductor element 2. The voltage of battery 17 is, therefore, impressed across the semi-conductor and the load resistor 18 in series. The relative magnitudes of the respective voltages across these two resistances may be measured by a device such as an electron discharge device 19 having a control electrode 20 to which voltage across resistor 18 may be applied. The output of device 19 may be fed to an indicator or control device 21 for establishing a control in accordance with the input signal from source 14. Resistor 18, discharge device 19, and indicator or control device 21, constitute a unidirectional current responsive device.

In the operation of the magneto-responsive device of this invention, a suitable electrical signal which may comprise an alternating current voltage or a direct current voltage or a combination of the two may be supplied from signal voltage source 14 and used to energize winding 13 to create a magnetic field in magnetic structure 4 in accordance therewith. The magnetic field which then exists between pole pieces 5 and 6 passes through semi-conductor element 2. Element 2 comprises a semi-conductor material, such as germanium, whose electrical resistance is dependent upon the flux density of a magnetic field therethrough. In this connection it has been found that, in an element of germanium, a magnetic field flux density of 12,000 gauss causes as much as a 25% increase in resistivity over the value of resistivity with no magnetic field. Element 2 is preferably of a highly purified type of germanium corresponding to a bulk resistivity above 10 ohm-centimeters and characterized by a substantial freedom of conductive impurities such as aluminum, tin arsenic, and gallium, since the presence of these elements, even in small amounts such as .1%, greatly lowers the resistivity of the germanium. Extremely minute traces, for example one part per million, of such impurities will, of course, still be present even in germanium purified to a resistivity above 10-ohm centimeters. These minute impurity traces evidently determine the conductivity-type of the germanium, i. e., whether the germanium is "N-type" or "P-type," as will be more fully explained hereinafter. High resistivity N-type germanium is customarily employed in germanium point contact rectifiers having a high rectification ratio, for example substantially above 100 to 1. High resistivity germanium is also desired in the present invention because the increase of resistance of germanium in the presence of a magnetic field, hereinafter referred to as the magneto-resistive effect, is proportional to the unmagnetized resistivity of the material. Semi-conductors which exhibit this magneto-resistive effect are hereinafter referred to as semi-conductors having magneto-resistive properties.

Element 2 is connected in series with resistor 18 and a voltage is impressed across both by means of battery 17. Variations in the resistance of element 2 due to the magneto-resistive effect cause variations in the proportion of the supply voltage from battery 17 which exists at a given time across element 2 and resistance 18. As a result, the voltage at the common connection between element 2 and resistor 18 supplied to control electrode 20 of electron discharge device 19 fluctuates with respect to ground. The signal thus derived is amplified by electron discharge device 19 and supplied to an indicator or control device 20. Device 20 may be any visual or audible indicator suitable to bring attention to the condition causing the signal from source 14. Alternatively, it may comprise an automatic control device for controlling temperature or any other condition or function controllable by an electrical voltage.

The magneto-responsive device system of this invention may also indicate or control in response to physical movements of a movable body such as 9. Through a suitable linkage such as that provided by members 10, 11 and 12 movement of body 9 causes a corresponding movement of magnetic structure 4 so that pole pieces 5 and 6 gradually assume a new position, for instance as at 5a and 6a. In this new position, the magnetic field provided by magnetic field structure 4 no longer traverses the semi-conductor element 2 and the resulting change in the resistivity of element 2 effects an indication or control signal at indicator or control device 21 in accordance with the new position of movable body 9.

Element 2 may comprise a slab or wafer of semi-conductor material and the electrical connections at 15 and 16 may be made by soldering suitable conductors to the semi-conductor element at the edges thereof. Pure tin solder is preferably used, although other soldering materials may be found to be satisfactory.

In Fig. 2 there is shown a detailed view of an embodiment of the invention wherein the semi-conductor element 2 comprises a conventional high rectification ratio germanium point-contact rectifier 22, and an alternating current source 17a replaces battery 17 of Fig. 1. Rectifier 22 comprises a tubular shell 23 which may be of a non-magnetic metallic material. A silver plug 24 having a copper conductor 25 extending axially therethrough fills and seals one end of shell 23. A semi-conductor pellet 26 of high resistivity N-type germanium is soldered at the end of the copper conductor on the inner face of the silver plug by means of a pure tin solder. The pellet may be about 0.06 inch in diameter and 0.02 inch thick. Also within the shell 23 is a steel rod 27 having a copper conductor 28 connected at one end, such as by insertion and soldering into a round hole drilled in the end thereof. Rod 27 carries a pointed electrode or cat whisker 29, which may be of Phosphor bronze, which is spot welded to a small projection 30 upstanding from the inner end of rod 27. The rod is firmly held in place within the shell by an insulating bead 31 which may be of a super-polyamide material such as nylon.

In constructing a rectifier of the type shown, the cat whisker 29 is first welded to rod projection 30 and the nylon bead is slipped over the rod. Thereafter, the rod and bead are press fitted into the shell in a desired position. The Phosphor bronze cat whisker 29 may preferably be 0.0015 inch in diameter and of an overall length before bending of about 0.1 inch. It is sharpened at the contact tip at 16 to provide an area of contact of the order of $10^{-7}$ square inches when in contact with the surface of the germanium pellet.

The pellet 26, after having been soldered to silver plug 24, is polished to substantially optical smoothness on the flat exposed surface. The pointed tip of the cat whisker at 16 is held against the germanium pellet with a force of about 150 milligrams under the force of deflection of cat whisker 29. Pole pieces 5 and 6 of magnetic structure 4 are positioned to produce a magnetic field through the germanium pellet in a manner encompassing the point contact 16, and the entire element 2 is fixedly positioned by clamping members 3.

One advantage of constructing the element 2 in the form of a rectifier 22 is that the current must pass through the point of cat whisker 29 at 16 in order to traverse the semi-conductor pellet 26. The resulting very small area of conduction in the semi-conductor immediately adjacent to the cat whisker point greatly increases the circuit resistance at the semi-conductor pellet, thereby proportionally increasing the magneto-resistive effect.

Another advantage of constructing element 2 in the form of a rectifier 22 is that the magneto-responsive device control system can now also be used with an alternating current power source 17a as well as with a direct current power source properly polarized to pass current in the easy flow direction of rectifier 22. If an alternating current source 17a is employed, a unidirectional component of current flows through resistor 18 as a result of the rectifying action of rectifier 22, and this direct current component also varies in accord with the intensity of signal source 14 as a result of the enhanced magneto-resistive effect of the magnetic field upon the point-contacting area of rectifier 22.

Certain semi-conductors may be said to be of the negative or "N" type and others of the positive or "P" type. These terms are defined below. Germanium may be of either the "P" or "N" type depending upon the type of impurity traces present. In the generalized embodiment of Figure 1, the semi-conductor may comprise either high resistivity N-type or high resistivity P-type semi-conductor material. However, in the embodiment shown in Fig. 2, rectifier 22 must have good rectification characteristics and strongly "N" type high resistivity germanium is preferably used for pellet 26 because strongly N-type germanium point-contact rectifiers ordinarily have a rectification ratio several thousand to one, while P-type germanium point-contact rectifiers are somewhat unpredictable, often showing little or no rectification. P-type germanium point-contact rectifiers may, of course, also be used if they are found or made to have sufficient rectification characteristics substantially above 100 to 1.

It will be appreciated that most commercially available point-contact germanium rectifiers employ an N-type germanium pellet highly purified to have a resistivity above 10-ohm centimeters and are suitable for use in connection with this invention.

The "P" type and "N" type designations for a semi-conductor may be defined as follows. If current is conducted through a semi-conductor element in one direction and a magnetic field is created through the same element in a direction perpendicular to the current, a voltage will be observable between two points which are aligned in a direction perpendicular to both the current and the magnetic field. This effect may be observed in both conductors and semi-conductors and is generally termed the "Hall" effect, the voltage generated thereby being called the "Hall" voltage. Generally it is observed, both with conductors and semi-conductors, that the sign of the Hall voltage is what would be expected if negative electrons carried the conduction current and were deflected in the magnetic field. However, many conductors and semi-conductors, including some samples of germanium, show a reverse "Hall" effect, as if positive particles were doing the conducting instead of the usual negative electrons. Semi-conductors which fall within the first of these two classes may be designated as negative or "N" type, and those in the second class as of the positive or "P" type.

It will be seen from the above description that this invention provides for a magneto-responsive device system which produces a signal in response to, and proportional to the strength of, a magnetic field and independent of the rate of change thereof which will provide indicator or control voltages useful in many applications.

While only certain preferred embodiments of the invention have been shown by way of illustration, many modifications will occur to those skilled in the art and it is, therefore, to be understood that the appended claims are intended to cover all such modifications as fall within the true spirit and scope of the invention.

What I claim as new and desire to secure by Letters Patent of the United States is:

1. A magneto-responsive device system comprising a germanium rectifier having a rectification ratio in excess of 100 to 1 and including a high resistivity germanium element and a pair of spaced connections thereto for the conduction of current therethrough, one of said connections comprising a metal electrode making a point contact with said element the order of $10^{-7}$ square inches in area which produces good rectification of alternating currents supplied between said connections, means for establishing a variable magnetic field of high intensity through said element and encompassing said point contact connection to vary the resistance of said element both within the bulk of said element and at said point contact so that said rectifier both rectifies and controls the magnitude of alternating current supplied between said connections, a source of alternating voltage and a load resistance connected in series circuit relationship with said rectifier so that the voltage developed across said load resistance comprises a rectified image of said alternating voltage which is varied in magnitude in accord with variations in the magnetic field established through said rectifier.

2. The magneto-responsive device system of claim 1 in which the means for establishing a variable magnetic field of high intensity through said element comprises a magnetic yoke having a pair of pole pieces diposed on opposite sides of said element, and means for producing relative movement between said magnetic yoke and said member.

3. The magneto-responsive device system of claim 1 in which the means for establishing a variable magnetic field of high intensity through said element comprises a magnetic yoke having a pair of pole pieces disposed on opposite sides of said element, an energizing winding on said magnetic yoke and a source of signal voltage connected to said winding.

4. The magneto-responsive device system of claim 1 in which the means for establishing a variable magnetic field of high intensity through said element comprises a magnetic yoke having a pair of pole pieces closely disposed to opposite sides of said element, an energizing winding about a portion of said magnetic yoke, a source of signal voltage connected to said winding and means for producing relative movement between said magnetic yoke and said element, the intensity of the field through said element depending upon both the source of signal voltage and the relative position between said magnetic pole pieces and said element.

References Cited in the file of this patent

UNITED STATES PATENTS

| | | |
|---|---|---|
| 817,664 | Plecher | Apr. 10, 1906 |
| 1,765,607 | Ohl | June 24, 1930 |
| 1,810,539 | Sokoloff | June 16, 1931 |
| 2,553,490 | Wallace | May 15, 1951 |
| 2,553,491 | Shockley | May 15, 1951 |
| 2,640,901 | Kinman | June 2, 1953 |
| 2,650,311 | Bray | Aug. 25, 1953 |

OTHER REFERENCES

Physical Review, vol. 74, page 976, August 15, 1948.